United States Patent [19]
Yamamoto

[11] Patent Number: 6,085,042
[45] Date of Patent: *Jul. 4, 2000

[54] CAMERA

[75] Inventor: Yuji Yamamoto, Kasukabe, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/188,684

[22] Filed: Nov. 10, 1998

[30] Foreign Application Priority Data

Nov. 13, 1997 [JP] Japan .................................. 9-312066

[51] Int. Cl.⁷ .................................................. G03B 17/18
[52] U.S. Cl. ......................... 396/121; 396/147; 396/296
[58] Field of Search ..................................... 396/121, 122, 396/123, 147, 233, 234, 299, 297, 287, 296, 292, 273

[56] References Cited

U.S. PATENT DOCUMENTS

| | | | |
|---|---|---|---|
| 4,075,640 | 2/1978 | Ueda et al. | 396/273 |
| 5,235,380 | 8/1993 | Yamada et al. | 354/471 |
| 5,659,814 | 8/1997 | Matsukawa et al. | 396/121 |

*Primary Examiner*—W. B. Perkey
*Attorney, Agent, or Firm*—Fitzpatrick, Cella, Harper & Scinto

[57] ABSTRACT

A camera includes area selecting means and display control means. The area selecting means has a first selecting mode in which a user selects a desired area from a plurality of areas and a second selecting mode in which at least one area is selected from the plurality of areas on the basis of a predetermined algorithm. The display control means displays the area selected from the plurality of areas by the user in a different form from the other areas when the first selecting mode is set, and displays at least some outer areas of the plurality of areas in a different form from the other areas when the second selecting mode is set.

18 Claims, 10 Drawing Sheets

CAMERA

BACKGROUND OF THE INVENTION

1. Field of the Invention

The present invention relates to a camera which has a plurality of focus detecting areas in a finder field and performs superimposed display of a focus detecting area for performing focus detection.

2. Related Background Art

Many cameras having a plurality of (e.g., five) focus detecting areas in a finder field have been conventionally used. In some of these cameras, an arbitrary selecting mode and an automatic selecting mode can be selectively set. In the arbitrary selecting mode, some of the focus detecting areas are set in accordance with selection operation by a photographer as areas for performing focus detection. In the automatic selecting mode, a camera automatically sets focus detecting areas for performing focus detection (e.g., sets all focus detecting areas as areas for performing focus detection).

In many cases of the above camera, when the arbitrary selecting mode is set, focus detection operation set in accordance with the selection operation is displayed with light in a finder field. When the automatic selecting mode is set, all of the five areas are displayed with light.

SUMMARY OF THE INVENTION

One aspect of the invention is a camera comprising area selecting means having a first selecting mode in which a user selects a desired area from a plurality of areas and a second selecting mode in which at least one area is selected from the plurality of areas on the basis of a predetermined algorithm. When the first selecting mode is set, the area selected from the plurality of areas by the user is displayed in a different form from the other areas. When the second selecting mode is set, at least some outer areas of the plurality of areas are displayed in a different form from the other areas. Accordingly, the user can clearly see which selecting mode is set. Additionally, the user can know the range in which a plurality of areas are gathering when the second selecting mode is set.

DESCRIPTION OF THE PREFERRED EMBODIMENTS

First Embodiment

Figure 1:
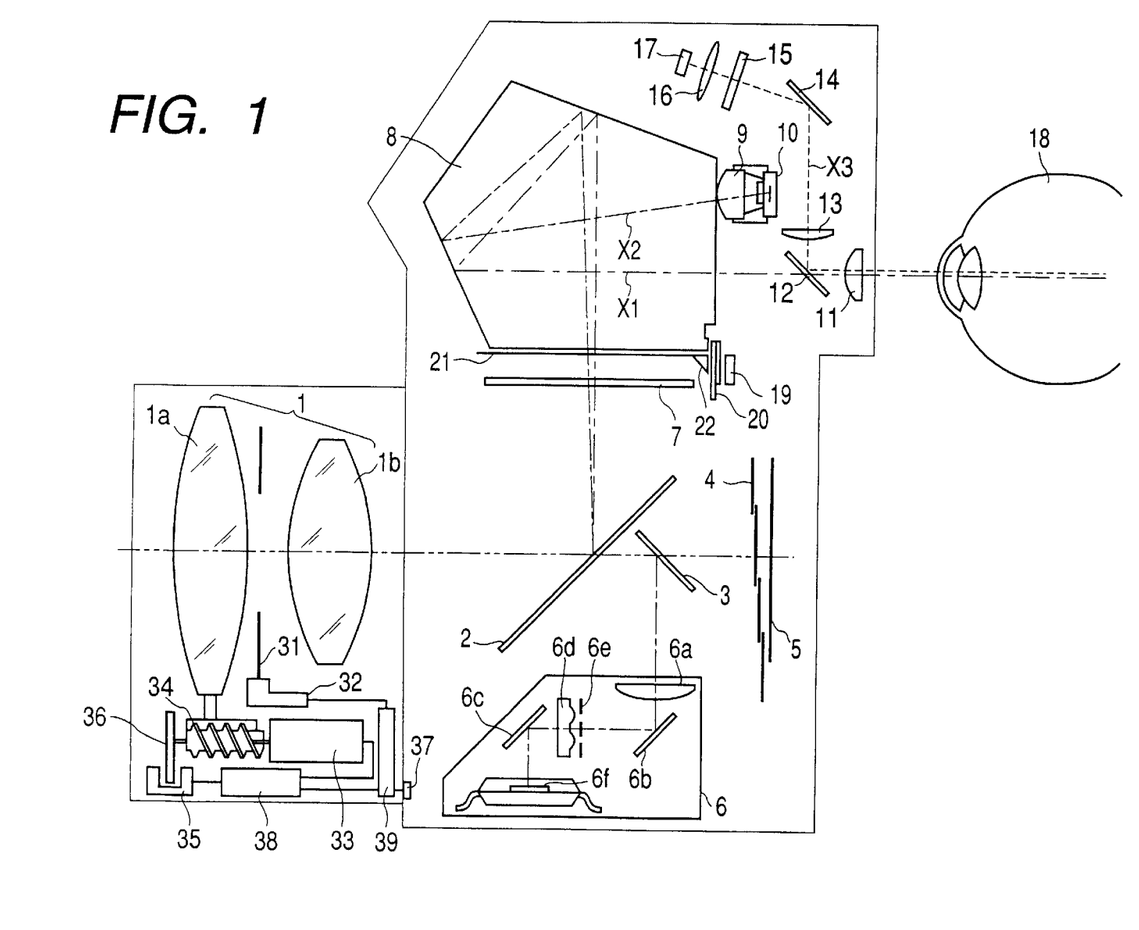
FIG. 1 is a view showing the optical arrangement of a single-lens reflex camera according to the first embodiment of the present invention.

FIG. 1 shows the optical arrangement of a single-lens reflex camera according to the first embodiment of the present invention. Referring to FIG. 1, a phototaking lens 1 is composed of two lenses 1a and 1b. However, an actual phototaking lens includes a large number of lenses.

A main mirror 2 is obliquely placed in a photographing optical path during finder observation and retracted from the photographing optical path when photographing is performed. A sub-mirror 3 reflects a light beam transmitted through the main mirror 2 during finder observation toward the lower portion of the camera body. The optical system also includes a shutter 4.

A photosensitive material 5 is a silver salt film, a solid-state image sensor such as a CCD or a MOS sensor, or a camera tube such as a vidicon.

Figure 2:
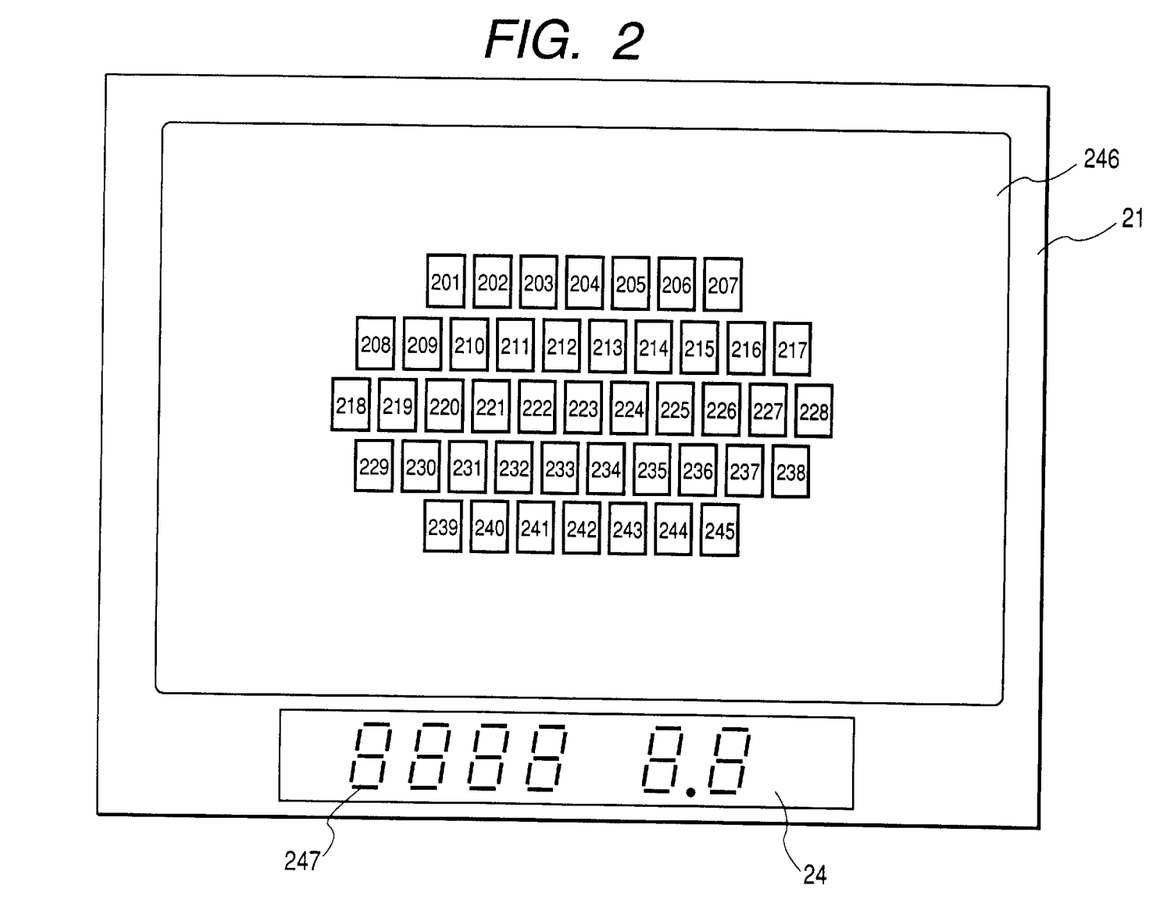
FIG. 2 is a view showing a finder field of the camera.

A focus detecting device 6 disposed in the lower portion of the camera body includes a field lens 6a placed near the image formation plane, reflecting mirrors 6b and 6c, a secondary image forming lens 6d, an aperture 6e, and an area sensor 6f which includes a plurality of CCDs or the like. This focus detecting device 6 performs focus detection by using a well-known phase difference method in a plurality of focus detecting areas 201 to 245 arranged in an observation frame 246 of a finder field as shown in FIG. 2. As shown in FIG. 2, these focus detecting areas 201 to 245 form lines in both the horizontal and vertical directions in the observation frame 246. Note that the range within which these focusing detecting areas 201 to 245 are formed in the observation frame 246 will be referred to as a focus detectable range hereinafter (in other words, the focus detectable range is constructed by the focus detecting areas 201 to 245).

A focusing plate 7 is disposed in the prospective image formation plane of the phototaking lens 1. A pentagonal prism 8 changes the finder optical path. Light from an object enters the phototaking lens 1 and separates into light on a finder optical path X1 and light on a photometric optical path X2 upon being reflected by the main mirror 2. The light on the finder optical path X1 forms an image on the focusing plate 7. The light transmitted through the focusing plate 7 is reflected inside the pentagonal prism 8 and guided to a pupil 18 of an observer through a half mirror 12 and an eyepiece lens 11. On the other hand, the light on the photometric optical path X2 is reflected inside the pentagonal prism 8 and guided to a photometric sensor 10 through an image forming lens 9. The photometric sensor 10 is conjugate to the focusing plate 7 and measures the luminance of the object image (the same image as the object image formed on the focusing plate 7) formed on the sensor surface by the image forming lens 9.

A superimposition display device is placed in the upper portion of the camera body. This superimposition display device includes a back-light LED 17, a Fresnel lens 16, a focus detecting area display liquid crystal panel 15 in which display segments corresponding to the focus detecting areas 201 to 245 are formed, a mirror 14, and a projecting lens 13. Light emitted from the back-light LED 17 into the Fresnel lens 16 is focused by the Fresnel lens 16 and incident on the focus detecting area display liquid crystal panel 15. The light beam transmitted through this display liquid crystal panel 15 is reflected by the mirror 14 and focused by the projecting lens 13. After that, the light beam is synthesized with the light (object image) on the finder optical path X1 by the half mirror 12 and guided to the pupil 18 of the observer through the eyepiece lens 11. Consequently, the focus detecting areas 201 to 245 are bright in the observation frame 246 to display focus detecting areas for performing focus detection (this display will be referred to as superimposition display hereinafter).

A finder field mask 21 is also shown in FIGS. 1 and 2. An in-finder LCD 20 displays photographing information in a non-observation frame area 247 in the finder field. This in-finder LCD 20 is illuminated by an illuminating LED (F-LED) 19 shown in FIG. 1. Light transmitted through the in-finder LCD 20 is guided into the viewfinder by a triangular prism 22 and displayed in the non-observation frame area 247 shown in FIG. 2.

FIG. 1 also shows an aperture 31 incorporated in the phototaking lens 1, an aperture drive circuit 32, a lens driving motor 33, and a lens driving member 34 constructed of, e.g., a driving gear. A photocoupler 35 detects rotation of a pulse plate 36 interlocked with the lens driving member 34 and transmits the rotation to a lens focus adjustment circuit 38. On the basis of this information from the photocoupler 35 and information about a lens driving amount from a lens control circuit 39, the lens focus adjustment circuit 38 drives the lens driving motor 33 by a predetermined amount to move the focusing lens 1a of the phototaking lens 1 to an in-focus position. The lens control circuit 39 controls the lens focus adjustment circuit 38 and the aperture drive circuit 32 on the basis of information from the camera. A well-known mount contact 37 interfaces the camera with the lens.

Figures 3, 3A:
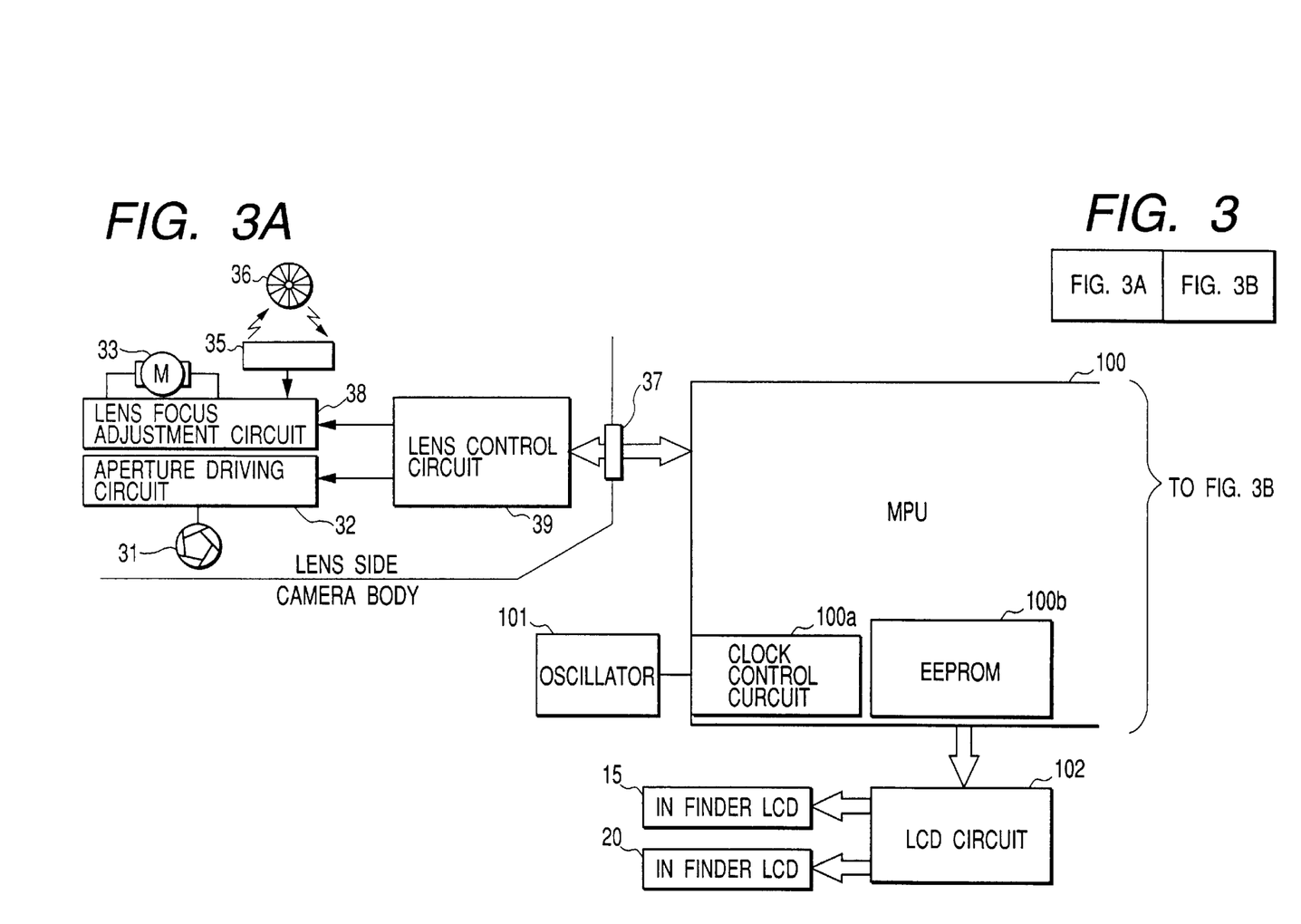
FIG. 3 is comprised of FIGS. 3A and 3B showing block diagrams of electric circuits of the camera.
Figure 3B:
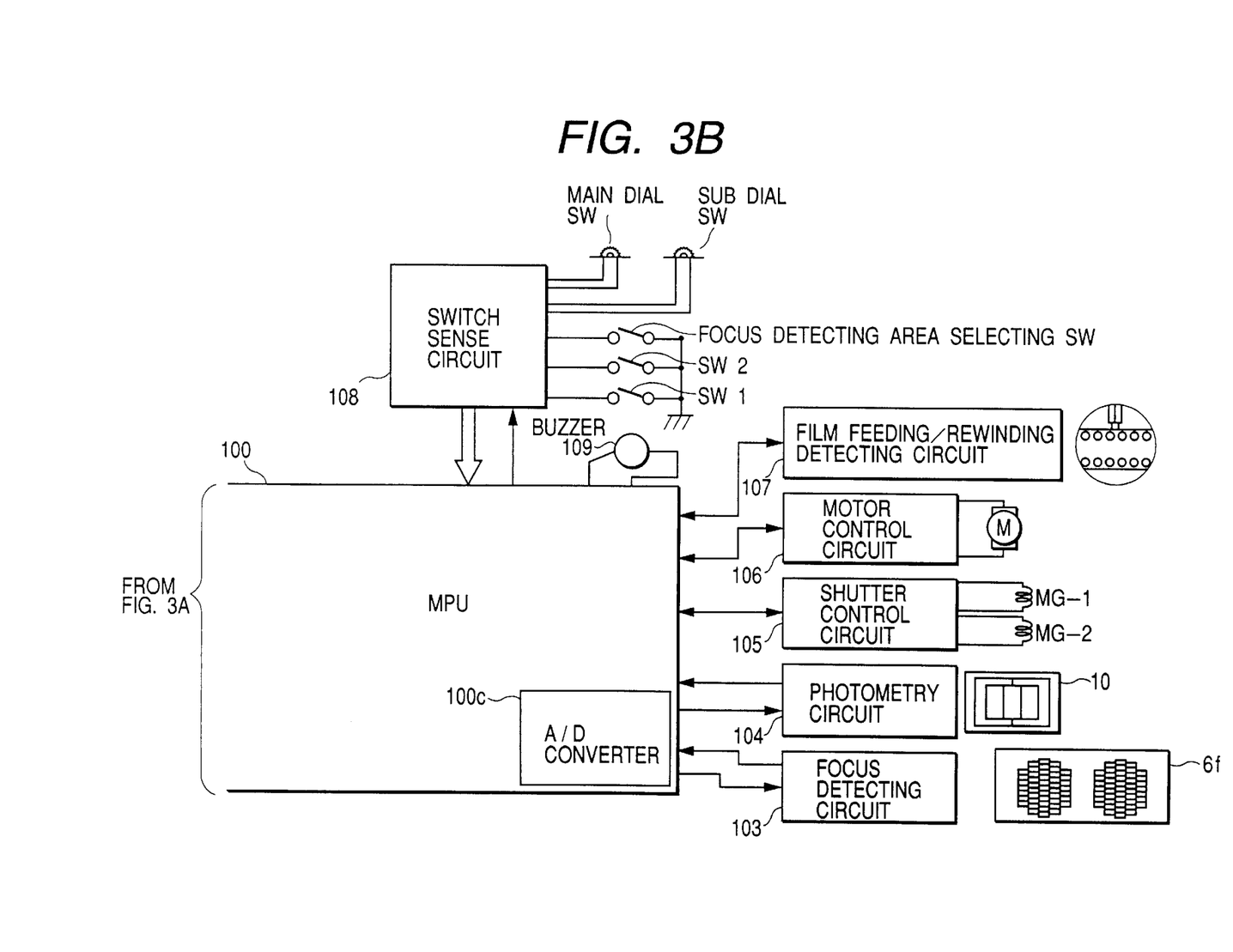

FIGS. 3A and 3B show the configuration of electric circuits incorporated into the camera. Referring to FIG. 3, a microcomputer (a central processing unit, to be referred to as an MPU hereinafter) 100 is a control means incorporated into the camera main body. The operating frequency of this MPU 100 is determined by performing no frequency division, ½ frequency division, or ¹⁄₁₆ frequency division for an output oscillation frequency from an oscillator 101 by an internal signal of the MPU 100. An EEPROM 100*b* stores photographing information such as a film counter. An A/D converter 100*c* A/D-converts input analog signals from a focus detecting circuit 103 and a multi-division photometry circuit 104 as will be described later.

The MPU 100 is connected to a liquid crystal display circuit 102, the focus detecting circuit 103, the photometry circuit 104, a shutter control circuit 105, a motor control circuit 106, a film feeding/rewinding detecting circuit 107, and a switch sense circuit 108. The MPU 100 is also connected to the internal lens control circuit 39 disposed in the phototaking lens 1 via the mount contact 37 shown in FIG. 1.

The liquid crystal display circuit 102 controls the focus detecting area display liquid crystal panel (in-finder LCD) 15 and the in-finder LCD 20 outside the finder field 246 in accordance with signals from the MPU 100.

The area sensor 6*f* is composed of 45 parts of CCDs or the like corresponding to the distance measurement points 201 to 245.

In accordance with a signal from the MPU 100, the focus detecting circuit 103 controls storage and reading of the area sensor 6*f* and outputs each of pixel informations to the MPU 100. The MPU 100 A/D-converts the information and performs focus detection by a well-known phase difference detection method. The MPU 100 sends the detected focus detection information to the lens control circuit 39 to perform lens focus adjustment.

The photometry circuit 106 supplies outputs from the photometric sensor 10 to the MPU 100 as luminance signals of each areas in the observation frame. The MPU 100 A/D-converts the luminance signals and adjusts exposure of photographing.

In accordance with a signal from the MPU 100, the shutter control circuit 105 controls magnets MG-1 and MG-2 to drive shutter leading and trailing curtains, thereby controlling exposure.

The motor control circuit 106 controls a motor M in accordance with a signal from the MPU 100 to move the main mirror 2 up or down, charge the shutter, and feed the film.

The film feeding/rewinding detecting circuit 107 checks whether one frame of the film is wound up during film feeding, and sends the signal to the MPU 100.

A switch SW1 is turned on by the first stroke of a release button (not shown) to start photometry and auto-focusing. A switch SW2 is turned on by the second stroke of the release button to start exposure.

A focus detecting area selecting SW sets the camera (MPU 100) in a focus detecting area selecting mode. When this selecting SW is operated during the camera being in the focus detecting area selecting mode, it is possible to switch automatic and arbitrary selecting modes (to be described later) or select focus detecting areas in the arbitrary selecting mode.

A main dial SW and a sub-dial SW are rotatable both clockwise and counterclockwise and generate two signals different in phase. The switch sense circuit 108 senses the status signals of the switches SW1 and SW2, the focus detecting area selecting SW, the main dial SW, the sub-dial SW, and other operating members (not shown) of the camera, and sends sense signals to the MPU 100. As will be described later, when the main dial SW is operated upon setting the arbitrary selecting mode, some of the focus detecting areas 201 to 245 for performing focus detection can be vertically moved (up or down). When the sub-dial SW is operated, these focus detecting areas for performing focus detection can be horizontally moved (to the left or right).

An operation of the camera (MPU 100) will be described below with reference to flow charts in FIGS. 4A and 4B and FIGS. 5A to 5F.

Figure 4A:
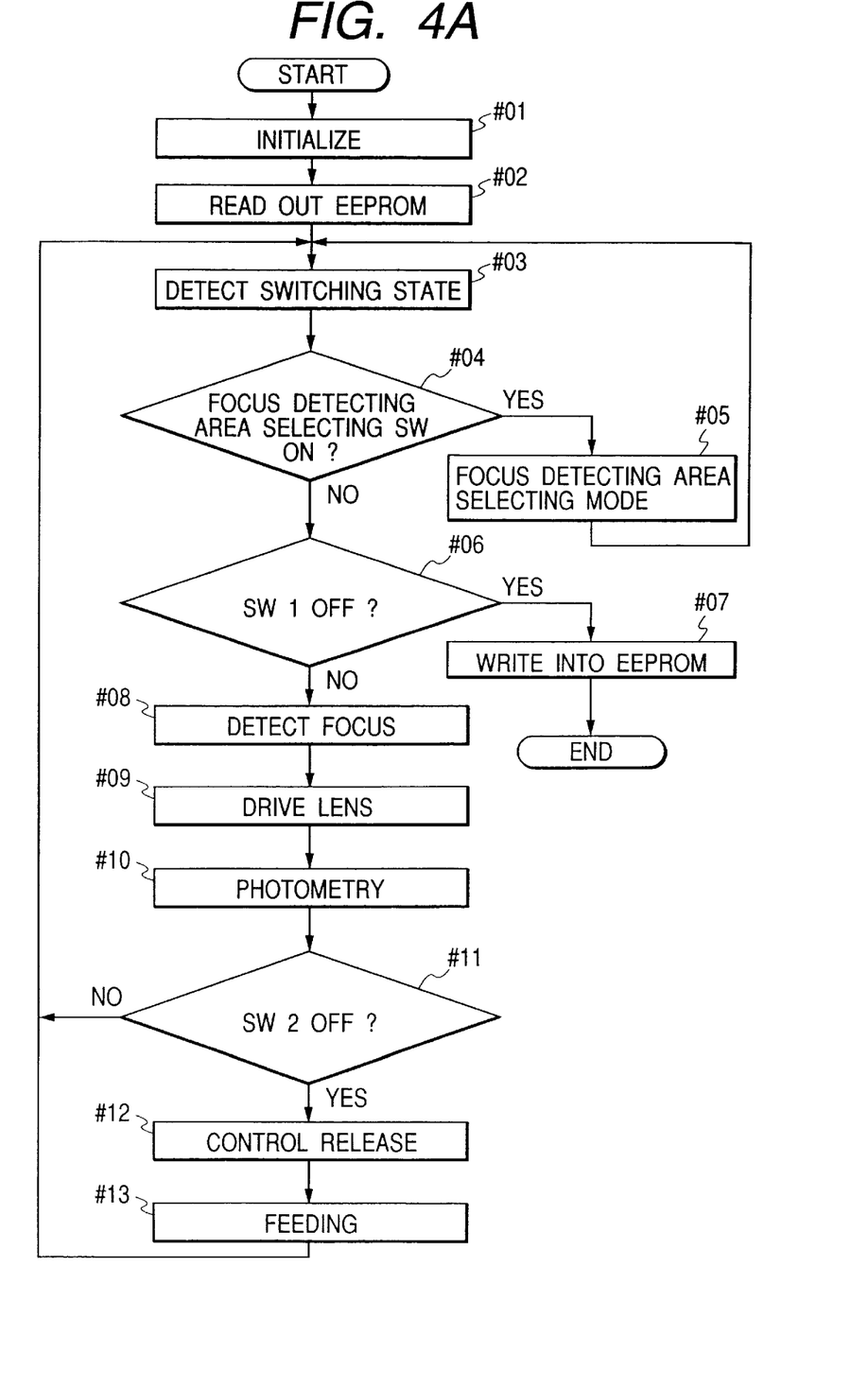
FIGS. 4A and 4B are flow charts showing a camera.

Referring to FIG. 4A, when the camera operation is started, the MPU 100 first initializes the interior of the MPU 100 in step #01. In step #02, the MPU 100 reads out the stored photographing information such as the focus detecting mode and film counter.

In step #03, the MPU 100 communicates with the switch sense circuit 108 to detect the states of switches.

In step #04, the MPU 100 checks whether the focus detecting area selecting SW for setting the camera in the focus detecting area selecting mode is ON. If the switch is OFF, the flow advances to step #06. If the switch is ON, the flow advances to step #05.

In step #05, the MPU 100 sets the camera in the focus detecting area selecting mode. Camera display and operation in this focus detecting area selecting mode will be described below with reference to FIGS. 4B and 5A to 5F. When the focus detecting area selecting mode is set, the MPU 100 performs superimposition display corresponding to the current selecting mode in the viewfinder in step #20. Note that the selecting mode at the start of camera operation is set by data in the EEPROM.

This selecting mode includes the arbitrary selecting mode in which the photographer can select arbitrary focus detecting areas for performing focus detection, and the automatic selecting mode in which the camera automatically selects focus detecting areas for performing focus detection on the basis of a predetermined algorithm.

Figure 6A:
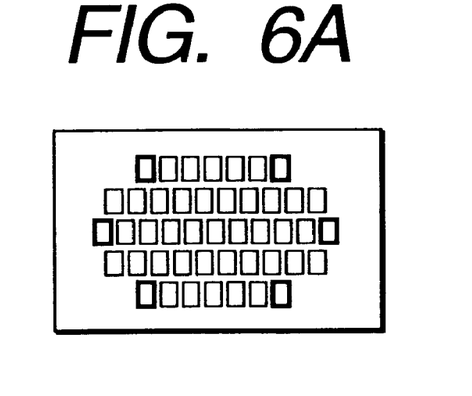
FIGS. 6A, 6B and 6C are views for explaining superimposition display in the camera.
Figure 6B:
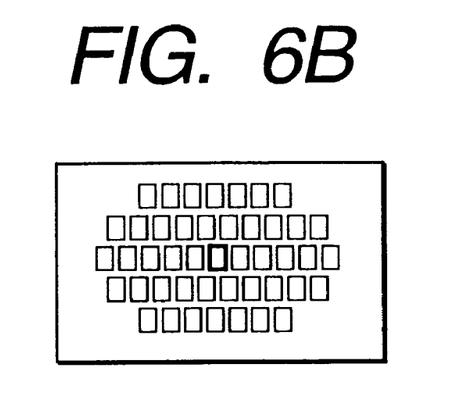

In the arbitrary selecting mode, as indicated by the thick lines in FIG. 6B, one (or two) selected area of all focus detecting areas is displayed on superimposing. In the automatic selecting mode, as indicated by the thick lines in FIG. 6A, some outermost focus detecting areas of all focus detecting areas are lighted up. This display pattern is different from the display pattern when the arbitrary selecting mode in which only the selected area is displayed on superimposing is set.

Figure 4B:
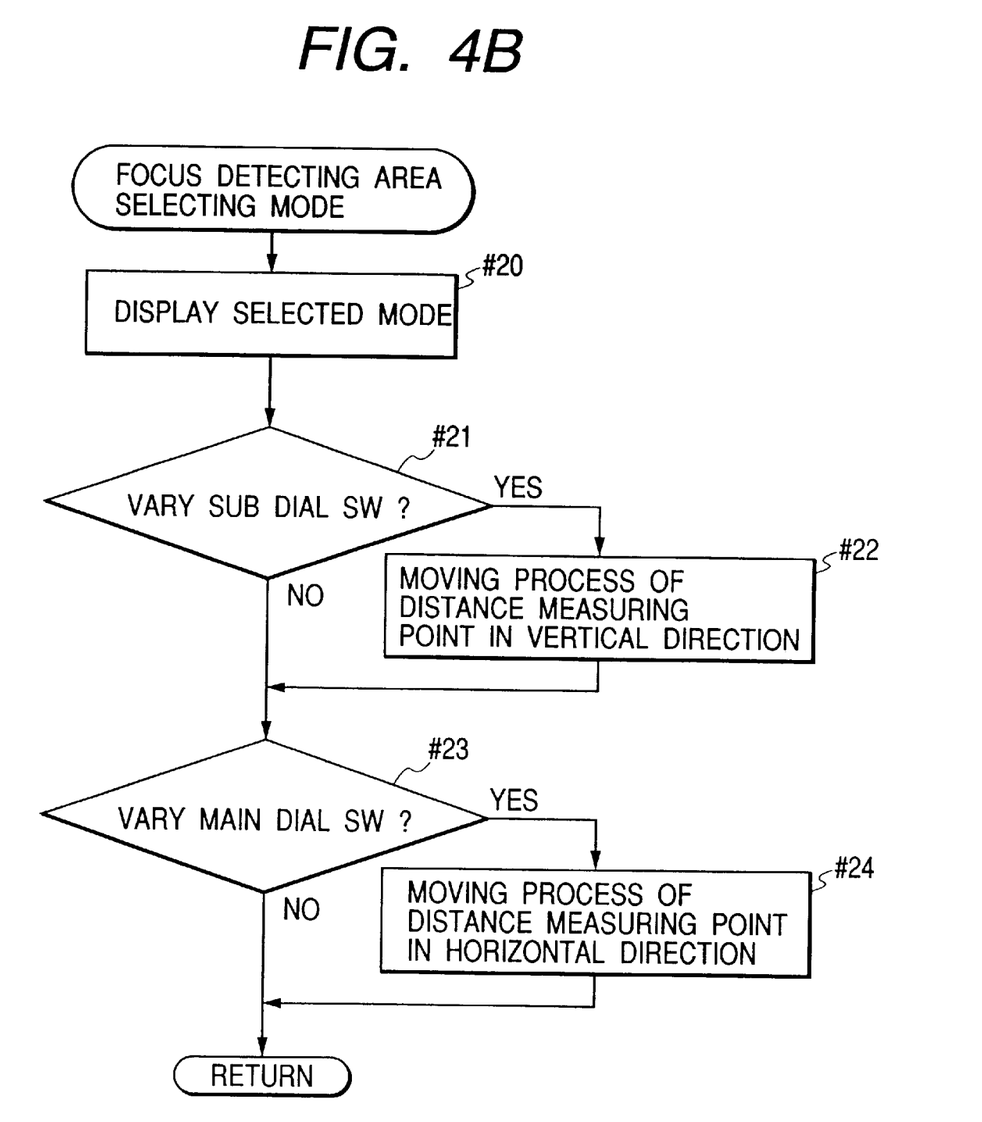

In step #21, the MPU 100 checks whether the signal from the sub-dial SW varies. If NO in step #21, the flow advances to step #23. If YES in step #21, the flow advances to step #22. In step #22, if the signal variation from the sub-dial SW corresponds to clockwise rotation of the sub-dial SW, the MPU 100 moves the focus detecting area for performing focus detection downward in accordance with the variation. If the signal variation from the sub-dial SW corresponds to counterclockwise rotation of the sub-dial SW, the MPU 100 moves the focus detecting area for performing focus detection upward in accordance with the variation. In addition to moving the focus detecting area, the MPU 100 displays the moved focus detecting area in superimposition.

In this embodiment, as shown in FIG. 2, vertical focus detecting areas are horizontally shifted from each other (i.e., each vertical line alternately includes one and two areas like one area→two areas→one area . . . ). Therefore, if the sub-dial SW is rotated while the uppermost or lowermost area of a predetermined vertical line is set as a focus detecting area for performing focus detection as indicated by 1 or 5 in FIG. 5A, this focus detecting area for performing focus detection vertically moves while the number of focus detecting areas is changed like one area→two areas→one area . . . , as indicated by 1 to 5 in FIG. 5A. On the other hand, if the sub-dial SW is rotated while the two uppermost or lowermost areas of a predetermined vertical line are set as focus detecting areas for performing focus detection as indicated by 1 or 5 in FIG. 5B, these focus detecting areas for performing focus detection vertically move while the number of focus detecting areas is changed like two areas→one area→two areas . . . , as indicated by 1 to 5 in FIG. 5B.

Figure 5A:
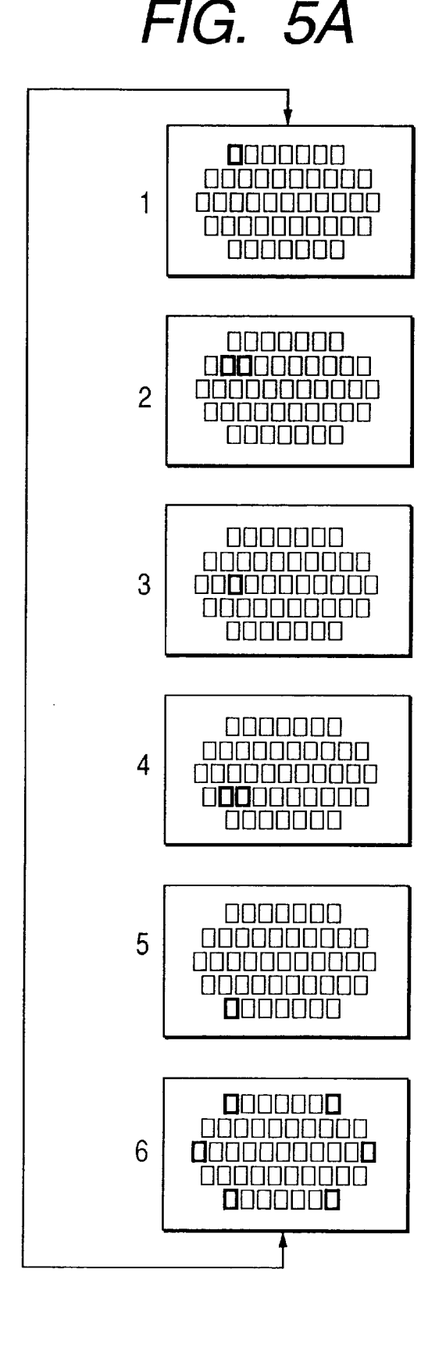
FIGS. 5A, 5B, 5C, 5D, 5E and 5F are views for explaining a focus detecting area moving process and superimposition display in the camera.
Figure 5B:
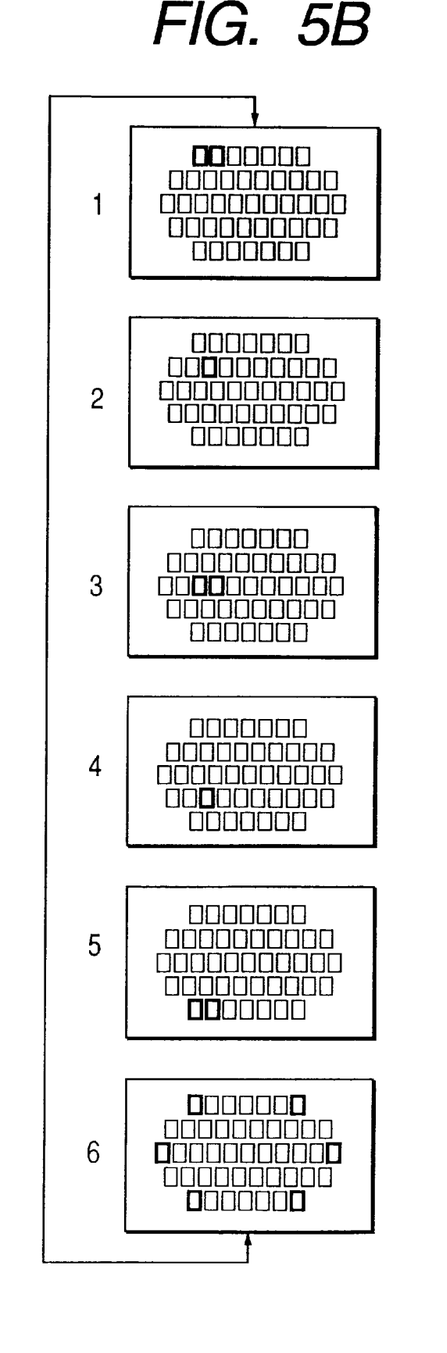

If, however, the sub-dial SW is rotated counterclockwise while the uppermost focus detecting areas of a predetermined vertical line are set as focus detecting areas for performing focus detection as indicated by 1 in FIGS. 5A and 5B, the selecting mode is switched from the arbitrary selecting mode to the automatic selecting mode. Likewise, if the sub-dial SW is rotated clockwise while the lowermost focus detecting areas of a predetermined vertical line are set as focus detecting areas for performing focus detection as indicated by 5 in FIGS. 5A and 5B, the selecting mode is switched from the arbitrary selecting mode to the automatic selecting mode. Consequently, the superimposition display is changed to a display state indicated by 6 in FIGS. 5A and 5B.

As described above, if the sub-dial SW is rotated counterclockwise while the uppermost focus detecting areas of a predetermined vertical line are set as focus detecting areas for performing focus detection as indicated by 1 in FIGS. 5A and 5B, the automatic selecting mode is set as indicated by 6 in FIGS. 5A and 5B. If the sub-dial SW is further rotated counterclockwise after that, the selecting mode is again switched from the automatic selecting mode to the arbitrary selecting mode. Additionally, focus detecting areas for performing focus detection are set as indicated by 5 in FIGS. 5A and 5B.

Similarly, if the sub-dial SW is rotated clockwise while the lowermost focus detecting areas of a predetermined vertical line are set as focus detecting areas for performing focus detection as indicated by 5 in FIGS. 5A and 5B, the automatic selecting mode is set as indicated by 6 in FIGS. 5A and 5B. If the sub-dial SW is further rotated clockwise after that, the selecting mode is again switched from the automatic selecting mode to the arbitrary selecting mode. Additionally, focus detecting areas for performing focus detection are set as indicated by 1 in FIGS. 5A and 5B.

In step #23, the MPU 100 checks whether the signal from the main dial SW varies. If No in step #23, the flow returns to step #20. If YES in step #23, the flow advances to step #24. In step #24, if the signal variation from the main dial SW corresponds to clockwise rotation of the main dial SW, the MPU 100 moves the focus detecting area for performing focus detection to the right in accordance with the variation. If the signal variation from the main dial SW corresponds to counterclockwise rotation of the main dial SW, the MPU 100 moves the focus detecting area for performing focus detection to the left in accordance with the variation. In addition to moving the focus detecting area, the MPU 100 displays the moved focus detecting area in superimposition.

Figure 5C:
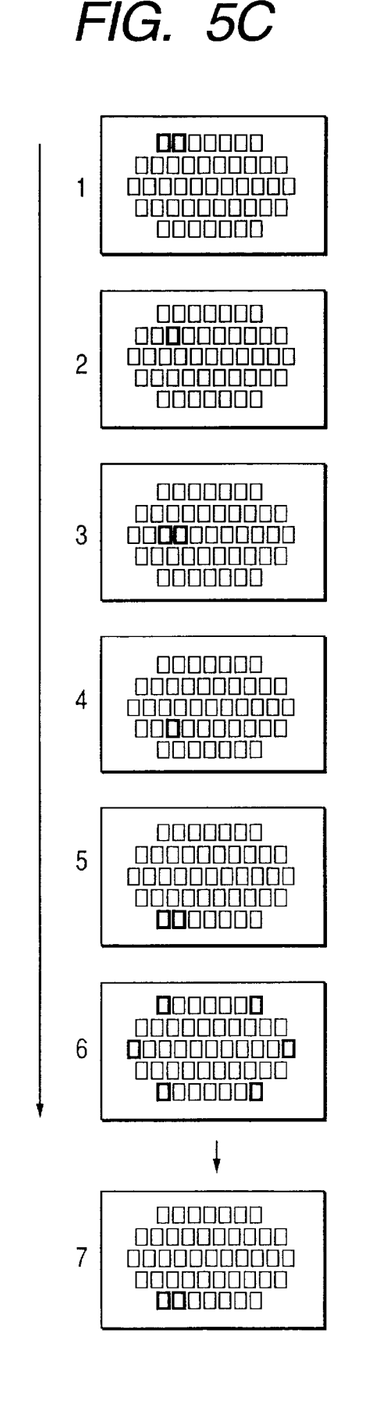
Figure 5D:
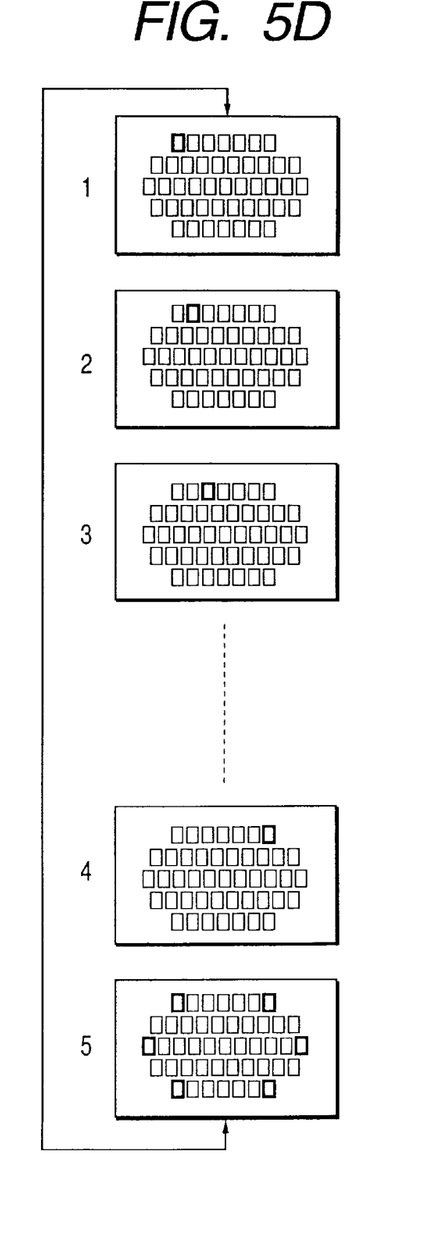

More specifically, if the main dial SW is rotated while the leftmost or rightmost area of a predetermined horizontal line is set as a focus detecting area for performing focus detection as indicated by 1 or 4 in FIG. 5D, this focus detecting area for performing focus detection moves to the right or left in the predetermined horizontal line as indicated by 1 to 4 in FIG. 5D.

Figure 5E:
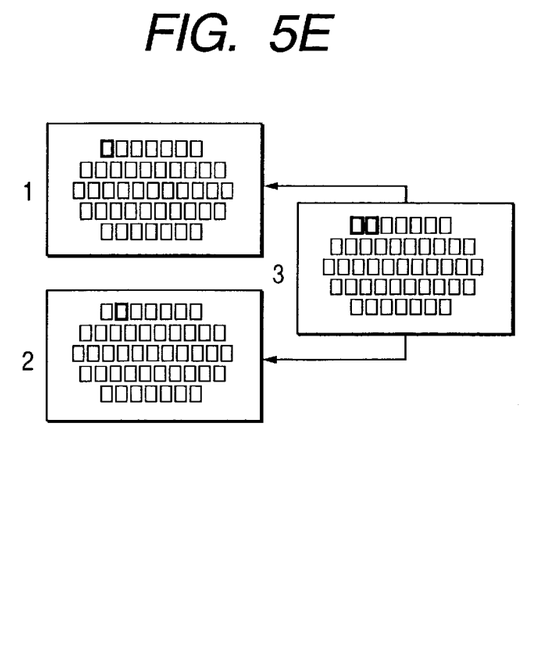

If the main dial SW is rotated clockwise while the two leftmost areas are set as focus detecting areas for performing focus detection as indicated by 3 in FIG. 5E, only the right one of these two areas is set as a focus detecting area for performing focus detection as indicated by 2 in FIG. 5E. However, if the main dial SW is rotated counterclockwise with this right area set, a state indicated by 1 in FIG. 5E is set instead of the state indicated by 3 in FIG. 5E. On the other hand, if the main dial SW is rotated counterclockwise while the two leftmost areas are set as focus detecting areas for performing focus detection, the left one of these two areas is set as a focus detecting area for performing focus detection as indicated by 1 in FIG. 5E.

Analogously, although not shown, if the main dial SW is rotated counterclockwise while the two rightmost areas are set as focus detecting areas for performing focus detection, only the left one of these two areas is set as a focus detecting area for performing focus detection. If the main dial SW is rotated clockwise in this state, a state indicated by 4 in FIG. 5D is set instead of the two-area set state. On the other hand, if the main dial SW is rotated clockwise while the two rightmost areas are set as focus detecting areas for performing focus detection, the right one of these two areas is set as a focus detecting area for performing focus detection as indicated by 4 in FIG. 5D.

Furthermore, if the main dial SW is rotated counterclockwise while the leftmost area of a predetermined horizontal line is set as a focus detecting area for performing focus detection as indicated by 1 in FIG. 5D, the selecting mode is switched from the arbitrary selecting mode to the automatic selecting mode. If the main dial SW is rotated clockwise while the rightmost area of a predetermined horizontal line is set as a focus detecting area for performing focus detection as indicated by 4 in FIG. 5D, the selecting mode is switched from the arbitrary selecting mode to the automatic selecting mode. Consequently, the superimposition display is changed to a display state indicated by 5 in FIG. 5D.

As described above, if the main dial SW is rotated counterclockwise while the leftmost area of a predetermined horizontal line is set as a focus detecting area for performing focus detection as indicated by 1 in FIG. 5D, the automatic selecting mode is set as indicated by 5 in FIG. 5D. If the main dial SW is further rotated counterclockwise after that, the selecting mode is switched from the automatic selecting mode to the arbitrary selecting mode. Additionally, a focus detecting area for performing focus detection is set as indicated by 4 in FIG. 5D.

Likewise, if the main dial SW is rotated clockwise while the rightmost area of a predetermined horizontal line is set as a focus detecting area for performing focus detection as indicated by 4 in FIG. 5D, the automatic selecting mode is set as indicated by 5 in FIG. 5D. If the main dial SW is further rotated clockwise after that, the selecting mode is switched from the automatic selecting mode to the arbitrary selecting mode. Additionally, a focus detecting area for performing focus detection is set as indicated by 1 in FIG. 5D.

On the other hand, if the sub-dial SW is rotated counterclockwise after focus detecting areas for performing focus detection have moved to the lowermost areas by counterclockwise rotation of the sub-dial SW as indicated by 1 to 5 in FIG. 5C, the automatic selecting mode is set as indicated by 6 in FIG. 5C. If the main dial SW is rotated clockwise or counterclockwise after that, the selecting mode is switched to the arbitrary selecting mode as indicated by 7 in FIG. 5C. Additionally, the lowermost focus detecting areas indicated by 5 in FIG. 5C, i.e., the focus detecting areas before the selecting mode is switched to the automatic selecting mode are set as focus detecting areas for performing focus detection. Similarly, if the sub-dial SW is rotated clockwise after focus detecting areas for performing focus detection have moved to the uppermost areas by clockwise rotation of the sub-dial SW, the automatic selecting mode is set. If the main dial SW is rotated clockwise or counterclockwise after that, the selecting mode is switched to the arbitrary selecting mode. Additionally, the uppermost focus detecting areas, i.e., the focus detecting areas before the selecting mode is switched to the automatic selecting mode are set as focus detecting areas for performing focus detection.

Figure 5F:
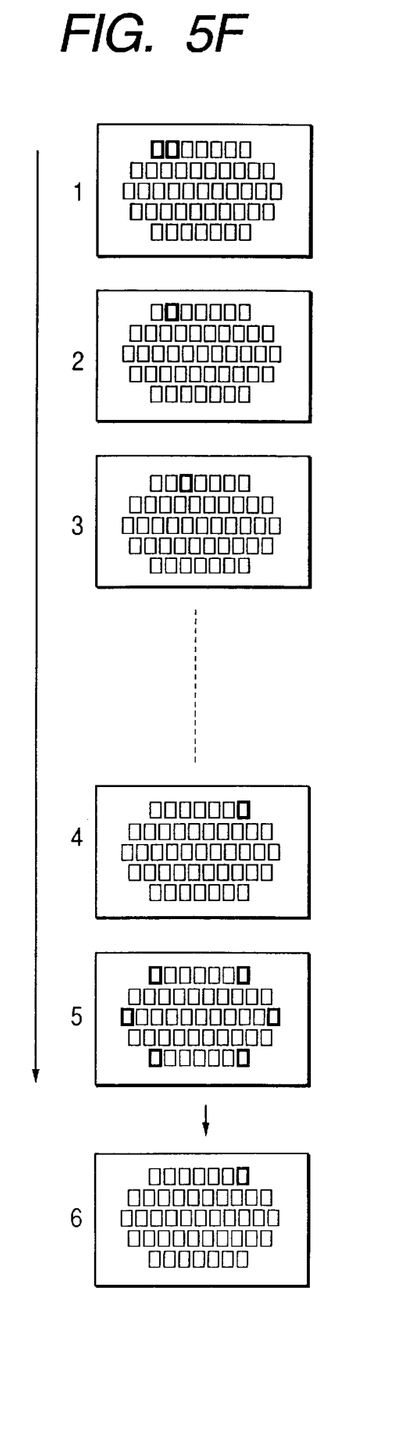

Also, if the main dial SW is rotated clockwise after a focus detecting area for performing focus detection has moved to the rightmost area by clockwise rotation of the main dial SW as indicated by 1 to 4 in FIG. 5F, the automatic selecting mode is set as indicated by 5 in FIG. 5F. If the sub-dial SW is rotated clockwise or counterclockwise after that, the selecting mode is switched to the arbitrary selecting mode as indicated by 6 in FIG. 5F. Additionally, the rightmost focus detecting area indicated by 4 in FIG. 5F, i.e., the focus detecting area before the selecting mode is switched to the automatic selecting mode is set as a focus detecting area for performing focus detection. Analogously, if the main dial SW is rotated counterclockwise after a focus detecting area for performing focus detection has moved to the leftmost area by counterclockwise rotation of the main dial SW, the automatic selecting mode is set. If the sub-dial SW is rotated clockwise or counterclockwise after that, the selecting mode is switched to the arbitrary selecting mode. Additionally, the leftmost focus detecting area, i.e., the focus detecting area before the selecting mode is switched to the automatic selecting mode is set as a focus detecting area for performing focus detection.

In step #06 shown in FIG. 4A, the MPU 100 checks whether the switch SW1 is OFF. If the switch SW1 is OFF, the flow advances to step #07, and the MPU 100 writes the photographing information in the EEPROM 100b and completes the program. If the switch SW1 is ON, the flow advances to step #08.

In step #08, the MPU 100 allows the focus detecting circuit 103 to perform focus detection in accordance with the focus detecting area selecting mode. The flow then advances to step #09, and the MPU 100 controls the lens control circuit 39 to perform lens focus adjustment in accordance with the focusing state detected in step #08. In step #10, the MPU 100 determines an exposure amount on the basis of the object luminance information from the photometry circuit 104.

In step #11, the MPU 100 checks whether the switch SW2 is OFF. If the switch SW2 is OFF, the flow returns to step #03. If the switch SW2 is ON, the flow advances to step #12, and the MPU 100 performs release control to expose the film. More specifically, prior to performing exposure, the MPU 100 raises the main mirror 2 to retract it from the photographing optical path. Subsequently, the MPU 100 controls the lens control circuit 39 to drive the lens aperture 31 to obtain an aperture amount based on the determined exposure amount. The MPU 100 then controls the shutter control circuit 105 to open the shutter for a shutter open time (shutter speed) based on the determined exposure amount, thereby completing the exposure. After that, the MPU 100 lowers the main mirror 2 retracted from the photographing optical path and again obliquely places the main mirror 2 in the photographing optical path.

The flow then advances to step #13, and the MPU 100 performs film feeding by driving the motor M via the motor control circuit 106 to wind up one frame of the film. Upon receiving a film feeding completion signal from the film feeding/rewinding detecting circuit 107, the MPU 100 completes the film feeding and returns to step #03.

Second Embodiment

Figure 6C:
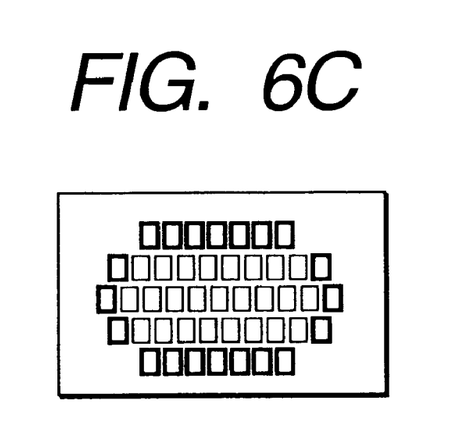

When the automatic selecting mode is set in the first embodiment, only some peripheral focus detecting areas in the focus detectable range (focus detecting areas 201 to 245) are displayed upon superimposing as shown in FIG. 6A (indicated by 6 in FIGS. 5A, 5B, and 5C and 5 in FIGS. 5D and 5F). In place of the display pattern as shown in FIG. 6A, all circumferential focus detecting areas in the focus detectable range can also be displayed upon superimposing as shown in FIG. 6C.

In the above embodiments, a plurality of focus detecting areas are arranged in both the horizontal and vertical directions in the observation frame. However, the present invention is also applicable to a camera in which focus detecting areas are arranged in a line in at least one of the horizontal and vertical directions in the observation frame (e.g., focus detecting areas are horizontally arranged in a line or arranged crosswise). When the automatic selecting mode is set in this camera, focus detecting areas in the two ends of the focus detecting area line are displayed in superimposition. Also, if a selecting operation (e.g., an operation of the main dial SW) is performed outward from the focus detectable range while a focus detecting area in one end of the focus detecting area line (focus detectable range) is set as an area for performing focus detection, a focus detecting area in the other end of the focus detecting area line can be set as an area for performing focus detection.

In the above embodiments, focus detection is performed in all focus detecting areas when the automatic selecting mode is set. However, the present invention is also applicable to a camera in which focus detection is performed in some (e.g., focus detecting areas near the center of the observation frame) of all focus detecting areas when the automatic selecting mode is set.

What is claimed is:

1. A camera comprising:
   a) area selecting means having a first selecting mode in which a user selects a desired area from a plurality of areas and a second selecting mode in which at least one area is selected from the plurality of areas on the basis of a predetermined algorithm; and
   b) display control means for displaying the area selected from the plurality of areas by the user in a different form from the other areas when the first selecting mode is set, and displaying at least some outer areas of the plurality of areas in a different form from the other areas when the second selecting mode is set.

2. A camera according to claim 1, wherein a selected area is a focus area.

3. A camera according to claim 1, wherein said display control means displays the area selected by the user by superimposing in a viewfinder when the first selecting mode is set, and displays at least some outer areas by superimposing in said viewfinder when the second selecting mode is set.

4. A camera according to claim 1, further comprising:
   an operating member that the user uses to select a desired area when the first selecting mode is set; and
   selecting mode control means for switching the first selecting mode to the second selecting mode when no area based on operation of said operating member exists.

5. A camera according to claim 4, wherein in a case that said operating member is operated after the first selecting mode is switched to the second selecting mode, said selecting mode control means again switches the second selecting mode to the first selecting mode.

6. A camera according to claim 5, wherein when said selecting mode control means again switches to the first selecting mode, an area selected changes in accordance with a direction in which said operating member is operated after said selecting mode control means switches the first selecting mode to the second selecting mode.

7. A camera comprising:
   a) area selecting means having a first selecting mode in which a user selects a desired area from a plurality of areas and a second selecting mode in which at least one area is selected from a plurality of areas on the basis of a predetermined algorithm; and
   b) display control means for displaying the area selected from the plurality of areas by the user in a different form from the other areas when the first selecting mode is set, and displaying some predetermined areas of the plurality of areas in a different form from the other areas when the second selecting mode is set.

8. A camera according to claim 7, wherein a selected area is a focus area.

9. A camera according to claim 7, wherein said display control means displays the area selected by the user by superimposing in a viewfinder when the first selecting mode is set, and displays some predetermined areas by superimposing in said viewfinder when the second selecting mode is set.

10. A camera according to claim 7, further comprising:
    an operating member that the user uses to select a desired area when the first selecting mode is set; and
    selecting mode control means for switching the first selecting mode to the second selecting mode when no area based on an operation of said operating member exists.

11. A camera according to claim 10, wherein in a case that said operating member is operated after the first selecting mode is switched to the second selecting mode, said selecting mode control means again switches the second selecting mode to the first selecting mode.

12. A camera according to claim 11, wherein when said selecting mode control means again switches to the first selecting mode, an area selected changes in accordance with a direction in which said operating member is operated after said selecting mode control means switches the first selecting mode to the second selecting mode.

13. A camera comprising:
    a) an operating member operable by a user;
    b) area selecting means having a first selecting mode in which at least one area is selected from a plurality of areas on the basis of an operation of said operating member and a second selecting mode in which at least one area is selected from the plurality of areas on the basis of a predetermined algorithm; and
    c) control means for switching the first selecting mode to the second selecting mode in case that no area based on an operation of said operating member exists.

14. A camera according to claim 13, wherein a selected area is a focus area.

15. A camera according to claim 13, wherein in a case that said operating member is operated after the first selecting mode is switched to the second selecting mode, said control means again switches the second selecting mode to the first selecting mode.

16. A camera according to claim 15, wherein when said control means again switches to the first selecting mode, an area selected changes in accordance with a direction in which said operating member is operated after said control means switches the first selecting mode to the second selecting mode.

17. A camera comprising:
    a) focus detecting means capable of performing focus detection for a plurality of areas in a scene, wherein said plurality of areas are arranged in one row in a first direction and not arranged in one row in a second direction perpendicular to the first direction; and
    b) selecting means for selecting at least one area among said plurality of areas.

18. A camera according to claim 17, wherein said plurality of areas are arranged in a manner successively alternating between blocks including one area and blocks including two areas in the second direction.

* * * * *

UNITED STATES PATENT AND TRADEMARK OFFICE
CERTIFICATE OF CORRECTION

PATENT NO. : 6,085,042
DATED : July 4, 2000
INVENTOR(S) : Yuji YAMAMOTO

It is certified that error appears in the above-identified patent and that said Letters Patent is hereby corrected as shown below:

COLUMN 3:

Line 53, "informations" should read --information--.
Line 61, "areas" should read --area--.

COLUMN 4:

Line 14, "during the camera being" should read --while the camera is--.

COLUMN 10:

Delete lines 20-56.

Signed and Sealed this

Twenty-second Day of May, 2001

Attest:

NICHOLAS P. GODICI

Attesting Officer  Acting Director of the United States Patent and Trademark Office